(12) United States Patent
Morris et al.

(10) Patent No.: US 12,348,099 B2
(45) Date of Patent: Jul. 1, 2025

(54) ELECTRIC MACHINE END WINDING DESIGN WITHOUT CONDUCTOR OVERLAP

(71) Applicant: FORD GLOBAL TECHNOLOGIES, LLC, Dearborn, MI (US)

(72) Inventors: Becky Sue Morris, Canton, MI (US); Franco Leonardi, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 342 days.

(21) Appl. No.: 18/086,855

(22) Filed: Dec. 22, 2022

(65) Prior Publication Data
US 2024/0213840 A1    Jun. 27, 2024

(51) Int. Cl.
*H02K 3/28* (2006.01)
(52) U.S. Cl.
CPC ...................... *H02K 3/28* (2013.01)
(58) Field of Classification Search
CPC ............ H02K 3/28; H02K 3/50; H02K 3/505; H02K 3/48; H02K 2203/06
USPC ................................................. 310/207, 208
See application file for complete search history.

(56) References Cited

U.S. PATENT DOCUMENTS

| | | | |
|---|---|---|---|
| 7,348,705 B2 | 3/2008 | Cai et al. | |
| 9,748,804 B2 | 8/2017 | Klassen | |
| 10,574,110 B2 | 2/2020 | Long et al. | |
| 10,707,713 B2 | 7/2020 | Liang et al. | |
| 2018/0205285 A1 | 7/2018 | Huang et al. | |
| 2021/0152043 A1* | 5/2021 | Leonardi | H02K 1/16 |
| 2021/0305864 A1* | 9/2021 | Ahmed | H02K 3/12 |

FOREIGN PATENT DOCUMENTS

JP    2009195006 A    8/2009

* cited by examiner

*Primary Examiner* — Alexander A Singh
*Assistant Examiner* — Charlie Frank Mann, Jr.
(74) *Attorney, Agent, or Firm* — David B Kelley; Brooks Kushman P.C.

(57) ABSTRACT

An electric machine includes a stator core defining slots having a number of radial positions. A winding is disposed in the core and has three phases, each of the phases having at least two parallel paths including hurdle-shaped conductors interconnected to form at least two continuous circuits between a terminal and a neutral. Each of the hurdle-shaped conductors have first and second uprights disposed in a different one of the slots and a bridge connecting between the uprights and extending circumferentially over an end surface of the core, wherein the bridges are stacked one on top of the other such that the winding has upper and lower layers. The bridges have variable thickness such that a number of bridges, at each of the upper and lower layers, extending over one of the slots exceeds the number of radial positions of that slot.

16 Claims, 7 Drawing Sheets

ELECTRIC MACHINE END WINDING DESIGN WITHOUT CONDUCTOR OVERLAP

TECHNICAL FIELD

This disclosure relates to the field of electric machines. More particularly, the disclosure pertains to hairpin winding design.

BACKGROUND

Electric machines (motors, generators, etc.) are comprised of several fundamental components that are common to many different types of machines: one or more current carrying components (the conductors or winding); a magnetic path component (the core); and a magnetic field source (either a coil or a magnet). In typical motors, including those currently employed in most electric vehicles, the stator includes windings comprising a plurality of straight portions extending axially through the core (usually passing through slots defined by the core), and a plurality of portions outside of and at each axial end of the core, generally referred to as end-turns. The end-turns electrically connect the axially oriented conductors inside slots defined by the core thereby completing the electrical circuit and creating the desired/ required number of electric phases. Although necessary for the correct functioning of the machine, the end-turn region contributes to electrical losses, weight, cost, and volume but not to torque. It is therefore desirable to reduce the length and electrical resistance of the end-turns.

It is conventionally known to manufacture the stator of an electric machine (EM) by inserting U-shaped "hairpin conductors" into axially extending slots formed in the stator from a first axial end of the stator and subsequently interconnecting the ends of the hairpins projecting from the opposite second axial end of the stator as necessary to achieve the desired circuit path. Each hairpin conductor is conventionally fabricated by bending a copper rod or bar with rectangular cross section. As a result, the shape and area of the conductor cross section remains the same throughout the machine. The end-turns must cross axially over one another at both ends of the stator, and this adds to the overall length of the windings. The end-turns may therefore comprise a significant portion of the total winding length that in short stack machines (defined as machines where the radius is much larger that the axial length) can reach 50% of the total copper content.

SUMMARY

According to one embodiment, an electric machine includes a stator core defining slots having a number of radial positions. A winding is disposed in the core and has three phases, each of the phases having at least two parallel paths including hurdle-shaped conductors interconnected to form at least two continuous circuits between a terminal and a neutral. Each of the hurdle-shaped conductors have first and second uprights disposed in a different one of the slots and a bridge connecting between the uprights and extending circumferentially over an end surface of the core, wherein the bridges are stacked one on top of the other such that the winding has upper and lower layers. The bridges have variable thickness such that a number of bridges, at each of the upper and lower layers, extending over one of the slots exceeds the number of radial positions of that slot.

According to another embodiment, an electric machine includes a stator core defining slots having a number of radial positions. A plurality of hurdle-shaped conductors are interconnected to form at least two parallel paths, each of the hurdle-shaped conductors including first and second uprights disposed in a different one of the slots and a bridge connecting between the uprights and extending circumferentially over an end surface of the core. The bridges are stacked one on top of the other in upper and lower layers. The bridges have variable thickness and are arranged to nest with each other such that a number of bridges extending over each of the slots at each of the upper and lower layers exceeds the number of radial positions of that slot.

According to yet another embodiment, an electric machine is manufactured using adaptive manufacturing techniques. The electric machine includes stratified layers arranged to form a stator core and a winding. The stator core defines slots having a number of radial positions. A winding is disposed in the core and has three phases, each of the phases having at least two parallel paths including hurdle-shaped conductors interconnected to form at least two continuous circuits between a terminal and a neutral. Each of the hurdle-shaped conductors has first and second uprights disposed in a different one of the slots and a bridge connecting between the uprights and extending circumferentially over an end surface of the core. The bridges are stacked one on top of the other such that the winding has upper and lower layers. The bridges have variable thickness such that a number of bridges, at each of the upper and lower layers, extending over one of the slots exceeds the number of radial positions of that slot.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
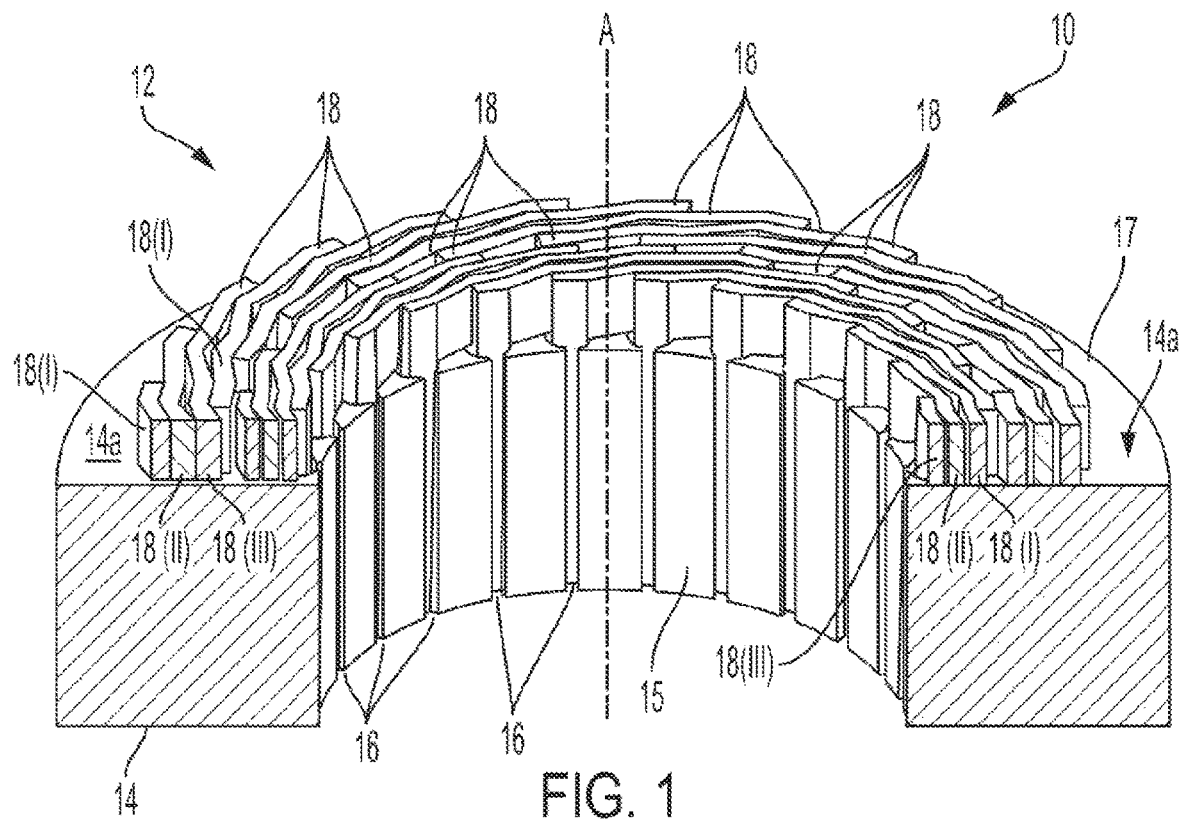
FIG. 1 is a perspective cross-sectional view of a portion of a stator of an electric machine showing only the lower tier of windings for illustrative purposes.

FIG. 1 shows the upper portion of a stator 12 of an electric machine 10. The electric machine 10 may be referred to as a hairpin electric machine, although, in some embodiments, the windings are formed by additive manufacturing rather than by a plurality of metal hairpin conductors that are welded together. The stator 12 comprises a core 14 having a plurality of circumferentially spaced and axially-extending slots 16 defined between teeth 15 that extend from a yoke 17. Central axis A indicates the axis of radial symmetry of core 14, and is also the axis-of-rotation of a generally cylindrical rotor (not shown) that, in an assembled electric machine, is supported within the stator for rotation. Core 14 is formed of a ferrous material such as iron or steel.

Stator 12 supports a winding 13 having three phases for example. Each phase has at least two parallel paths extending from the terminal to the neutral (not shown). Each path includes a plurality of conductors 18 that are disposed in slots 16 and extend along a top axial end-surface 14a of core 14 and a bottom end-surface (not visible is FIG. 1) of the core 14. As used herein, the terms "top," "bottom," "upper," "lower," and similar terms refer only to the orientation of the stator as depicted in these drawings, and it is understood that an electric machine can be operated in any orientation. The shown windings are known as hairpin windings.

Figure 2:
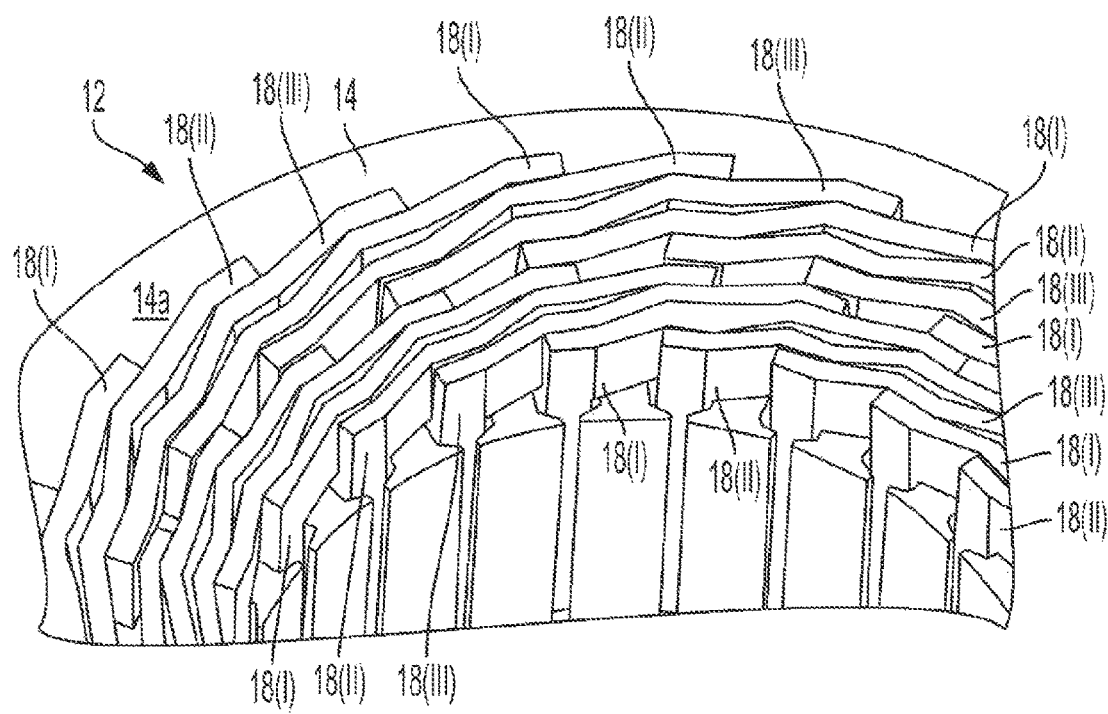
FIG. 2 is a perspective view showing a portion of a top axial end of the stator shown in FIG. 1.

Stator 12 is depicted as a three-phase device with six conductors-per-slot, but this is only by way of example as the inventive concepts disclosed herein may be employed in an electrical device having any number of phases and conductors-per-slot. In FIG. 2, the Roman numerals I, II and III indicate the electrical phase of each conductor 18. Some of the slots only include a single phase, whereas other slots include at least two of the phases.

Conductors 18 are formed of material high in electrical conductivity (such as copper) and are covered by a non-conductive coating so as to be electrically insulated from one another and from core 14. Because the insulating coating is very thin relative to the size of the conductors it is not shown in the figures or identified by a reference number.

Figure 3:
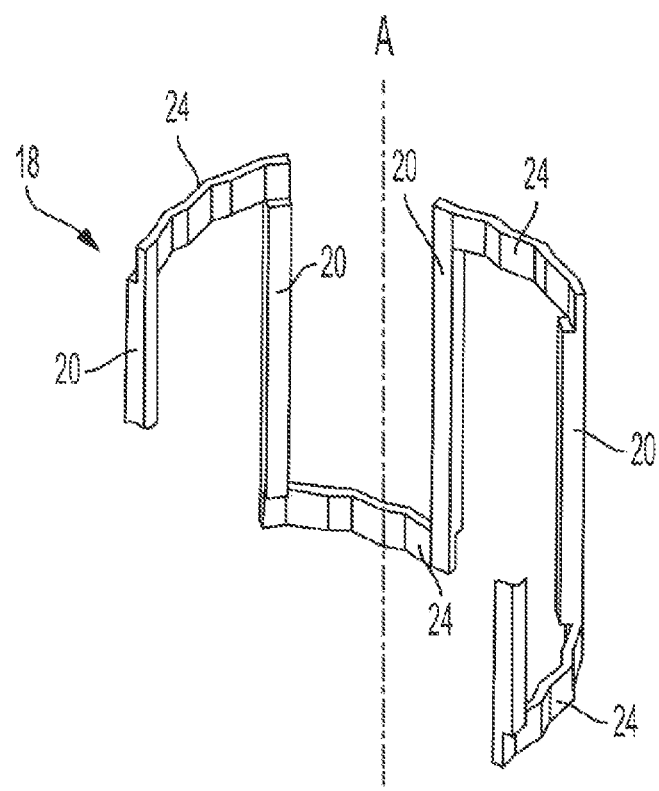
FIG. 3 is a partial perspective view of a representative one of the conductors of FIGS. 1 and 2 in isolation from the core and other conductors.

FIG. 3 depicts a portion of a representative conductor 18 in isolation from other components of stator 12. Each conductor 18 is a continuous element including axially extending portions 20 (also referred to as uprights or legs) disposed in the slots and bridge portions 24 (sometimes referred to as end-turns) connecting the in-slot portions 20. Bridge portions 24 extend generally circumferentially over the core end-surfaces 14a (as shown in FIGS. 1 and 2) to create the circuit paths required for functioning of the electric machine 10.

The plurality of conductors 18 may advantageously be formed using an additive manufacturing process (also known as three-dimensional printing) wherein stratified layers of material are deposited in sequence on top of one another. In such a process, the conductors 18 may be printed simultaneously with one another and with core 14. An insulating layer (not shown) surrounding the conductors 18 may also be formed simultaneously by such a process. If the insulating layer between the conductor and the core is also printed at the same time, it is possible to completely fill the available space in each slot so a void-free electric machine 10 can be created. As an alternative, the conductors may be manufactured separately from the core and in two stages, wherein the second endturn is printed after the rest of the winding has been inserted in the core, or joined to the rest of the winding.

Figure 4:
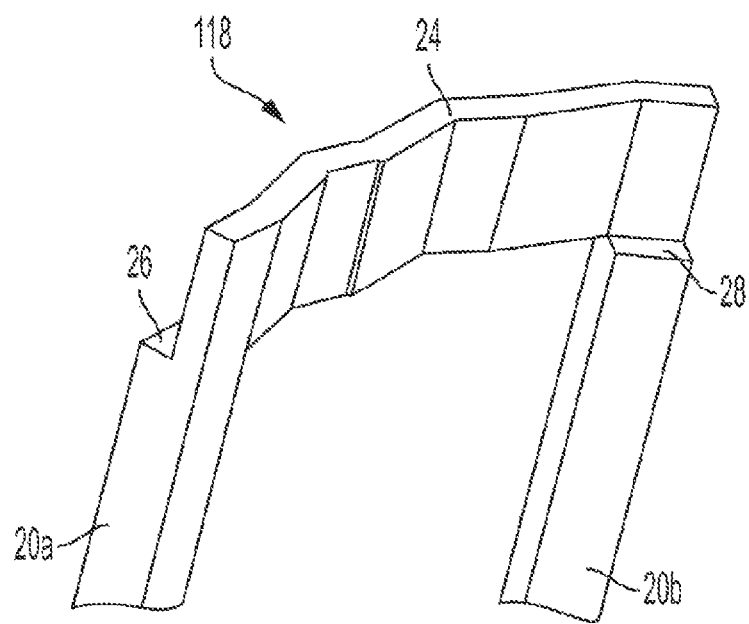
FIG. 4 is an enlarged view of a hurdle-shaped section of a representative one of the conductors shown in FIGS. 1-3.

For purposes only of further description, each conductor 18 depicted in FIG. 3 may be said to be composed of a co-joined series of hurdle-shaped conductors 18, one of which is depicted in isolation in FIG. 4. Each hurdle-shaped conductor 118 includes a first upright 20a, a second upright 20b, and a bridge 24 extending between, connecting, and formed integrally with the uprights. Uprights 20a, 20b are each disposed in a different one of the slots 16, the respective slots separated by one or more intervening slots which are spanned by bridge 24. The number of intervening slots spanned by bridge 24 varies. For example, the conductors may have a slot span of five or seven (see FIG. 11).

Each of the slots includes a plurality of radial positions the receive one upright of the conductors 18. The number of radial positions may vary. In one embodiment, each slot 16 includes six radial positions. The conductors 18 may be arranged with the first upright 20a is a first of the positions and the second upright 20b in a second of the positions. That is, the first upright 20a is located radially closer to the central axis A than the second upright 20b, and bridge 24 steps radially outward as it extends from the first (relatively more inboard) upright to the second (relatively more outboard) upright. In the depicted embodiment, bridges 24 step radially outward by one radial position as they extend clockwise over end surface 14a. The outward step of the bridges may, however, be in the counter-clockwise direction as dictated by the desired rotation direction of the motor.

Referring to FIG. 4, the bridges 24 are thinner than the uprights 20a/20b. This allows the bridge-upright joints to be offset to the yoke side or the gap side. For example, a first end of bridge 24 is connected to a radially inner portion of first upright 20a (gap side) such that the junction between the bridge and the first upright is configured to define a radially outward-facing ledge 26, and a second end of the bridge is connected to a radially outer portion of the second upright 20b (yoke side) such that the junction between the bridge and the second upright is configured to define a radially inward-facing ledge 28.

In the embodiment depicted in FIG. 4, outward-facing ledge 26 and inward-facing ledge 28 are configured as right-angled surfaces. That is, the ledges 26, 28 are substantially perpendicular to the longitudinal axes of uprights 20a, 20b and substantially parallel with a plane perpendicular to axis A when the uprights 20a, 20b are disposed in their respective slots 16. In the alternative embodiment shown of FIG. 5, an inward-facing ledge 28' (and similarly, the outward-facing ledge, not shown, at the other end of bridge 24') may be inclined or sloped with respect to end-surface 14a to form a gradual transition in cross-sections at the junctions between the uprights and the bridge.

Among the advantages of forming the conductors 18 simultaneously with core 14 by a 3D-printing process is that the conductors may completely (or nearly completely) fill the cross-sectional area of their respective slots, thereby producing a very compact and efficient (due to reduced resistance) electrical machine. 3D printing also enables economical manufacture of conductors having gradual transitions in cross-sectional area and bend geometries, which are intended to avoid "bottlenecks" that may impede flow of electric current through the conductors.

Figure 5:
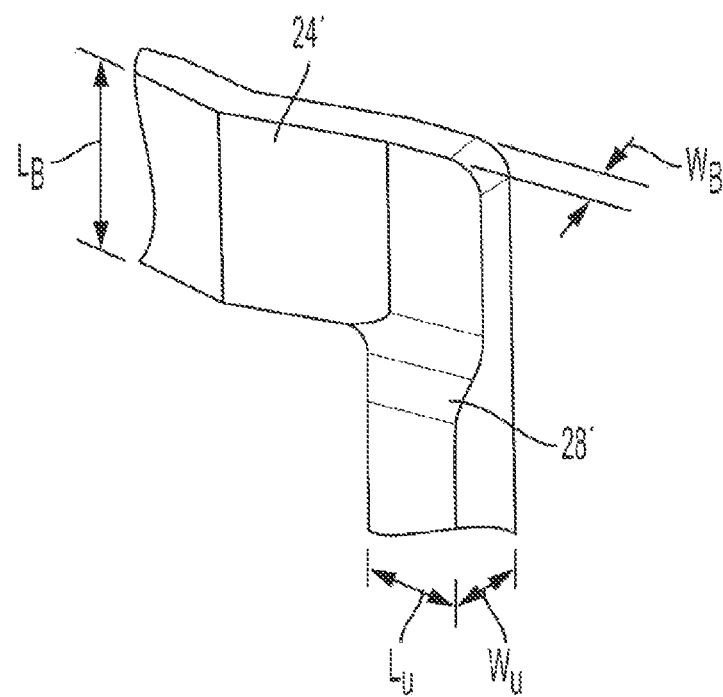
FIG. 5 is a further enlarged view of a portion of another embodiment of a hurdle-shaped section of a conductor.

The uprights 20a, 20b (that is, the in-slot portions) of all conductors 18 may be of equal and uniform cross-sectional area. Said cross-sectional area is shown in FIG. 5 to be $W_u \times L_u$, assuming that the conductor is approximately rectangular in cross-sectional shape. Also, the cross-sectional area of the bridges 24 may be equal to or greater to that of the uprights. This may be achieved, as best seen in FIG. 5, if a bridge width $W_B$ and bridge length $L_B$ are selected such that $W_B$ is approximately equal to $\frac{1}{2}W_U$ and $L_B$ is approximately equal to $2W_U$. In this way, the cross-sectional area perpendicular to the current flow through the conductor remains relatively constant throughout the length of the conductor.

Figure 6:
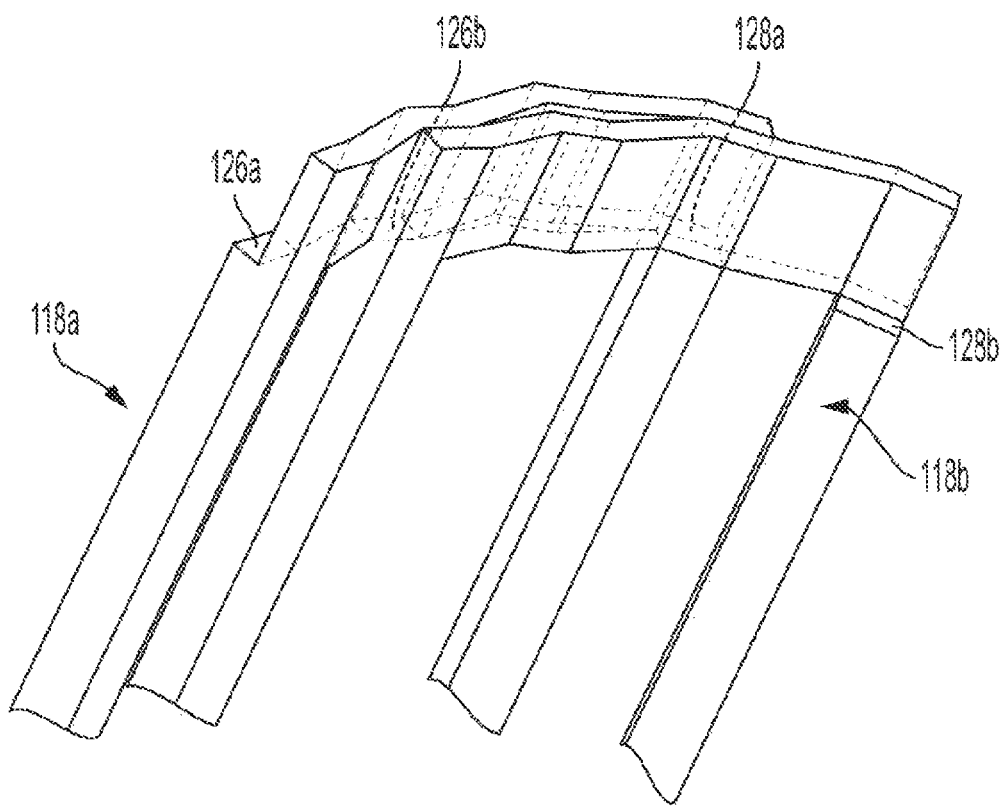
FIG. 6 is a perspective view of two radially adjacent conductors shown in FIGS. 1-3, in isolation from the core and other conductors.

Referring again to FIGS. 1 and 2, it is apparent that radially adjacent bridges 24 of each conductor 18 lay or "nest" against one another in the radial direction and do not cross over (overlap axially) one another. This nested relationship between radially-adjacent conductors will now be described with reference to FIG. 6, in which two conductors 118a, 118b are shown in isolation from the rest of the winding. The two conductors shown may represent any pair of radially-adjacent conductors that compose windings. As shown, the following relationships exist: 1) The bridge of a radially outer conductor 118a lies in and passes over the outward-facing ledge of a radially inner conductor 118b, and 2) The bridge of the radially inner conductor 118b passes over and lies in the inward-facing ledge of the radially outer conductor 118a (which is disposed immediately adjacent conductor 118a). As this closely-nested relationship between each pair of radially-adjacent conductors 118a, 118b is repeated around the circumference and across the radius of stator 12, there is no requirement for the bridge of any conductor to cross axially over the bridge of a radially-adjacent conductor.

As compared with a conventionally known stator in which the bridges of conductors cross over (overlap) one another, the disclosed configuration allows for conductors to be shorter in total length and therefore use less material and produce less electrical resistance. Further, the disclosed stator 12 (and hence the electrical machine overall) may be more axially compact than is known in the prior art.

Figure 7:
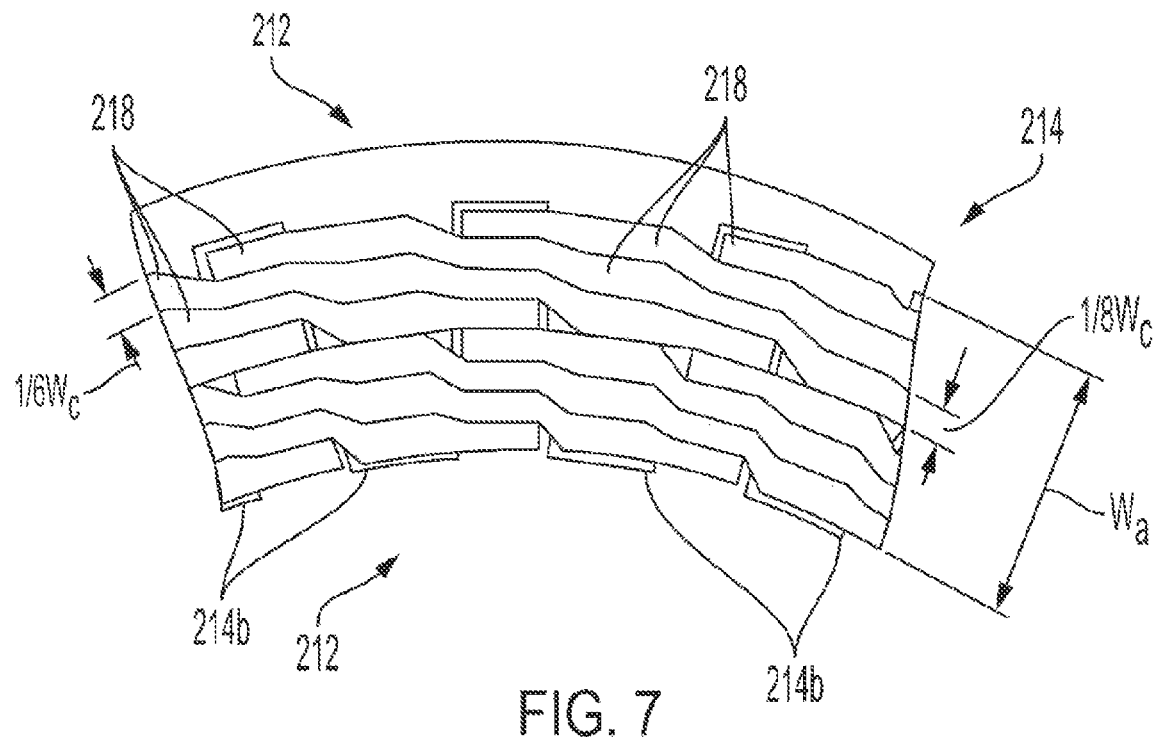
FIG. 7 is a top view of another portion of the stator.
Figure 8:
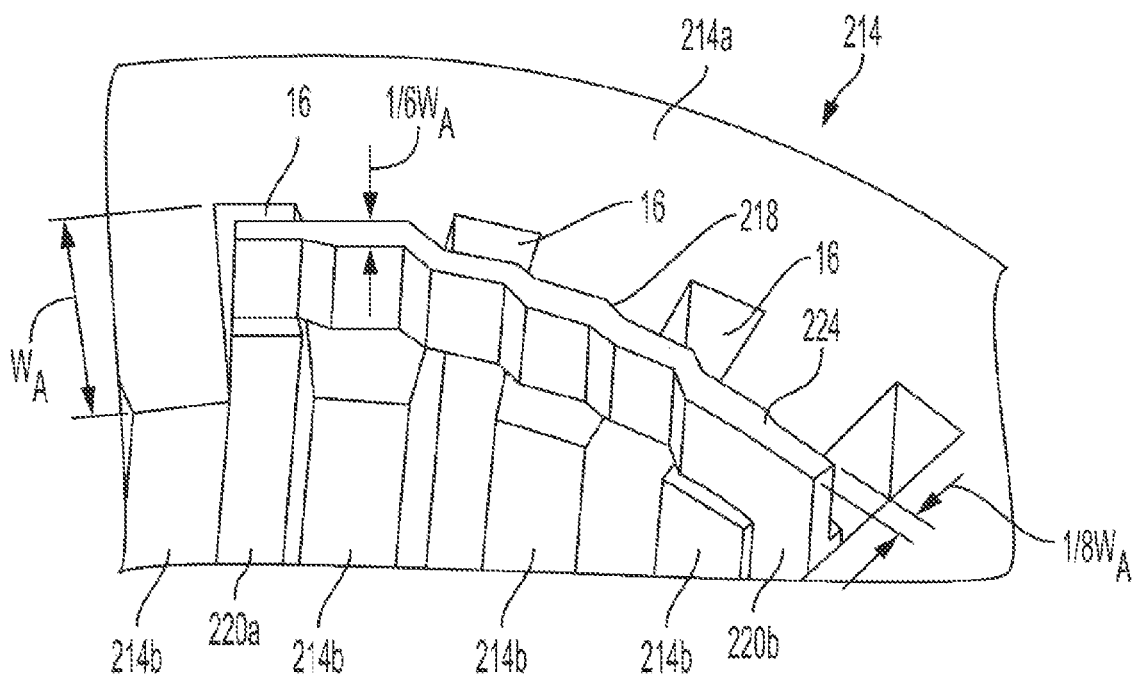
FIG. 8 is a schematic perspective view of the core and one hurdle-shaped conductor of the stator shown in FIG. 7.

FIGS. 7 and 8 show pertinent portions a stator 212 having conductors 218 that include bridges 224 (only one of which is shown in FIG. 8 for clarity) that vary in width along their respective circumferential lengths/spans. Specifically, the portions of bridge 224 passing over (directly axially above) the teeth 214b separating slots 16 are greater in radial width than the adjacent portions of the bridge passing over the slots 16. Adapting the width of the bridge portions 224a, 224b to fill all available radial space yields bridges having the minimum amount of electrical resistance for a given axial length. This varying of the radial widths of the bridges is also enabled by a 3D printing process. In some embodiments, the bridges may have a constant cross-sectional area by adjusting the height to account for narrowing of the bridges in some areas.

Figure 9A:
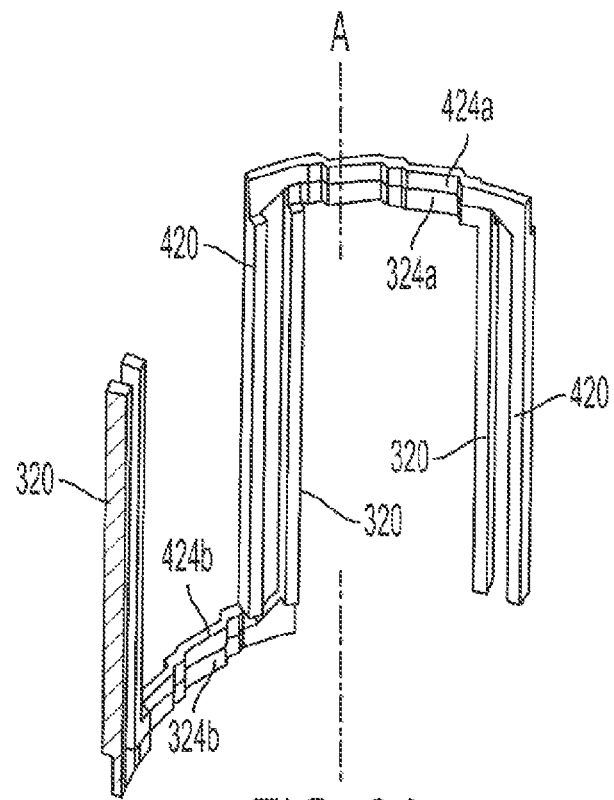
FIG. 9A is a perspective view of portions of conductors of the stator, in isolation from all other stator components.
Figure 9B:
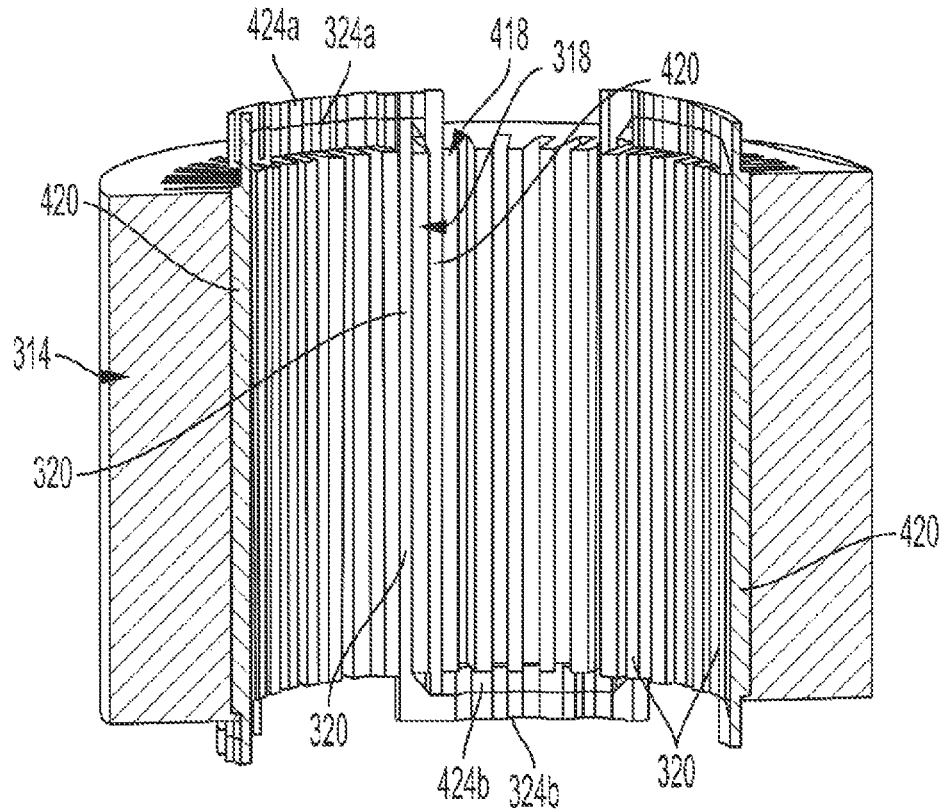
FIG. 9B is a perspective cross-sectional view of the core of the stator showing both tiers of the conductors.
Figure 10:
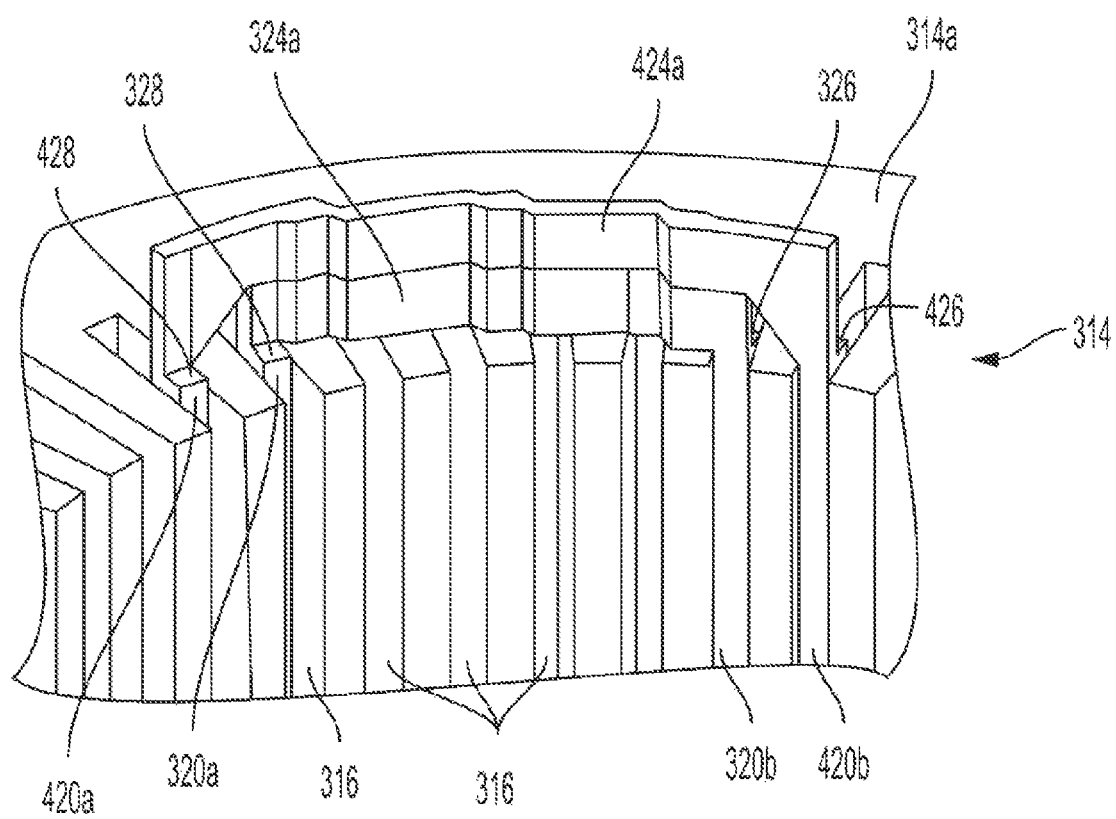
FIG. 10 is an enlarged perspective view of the inner and outer hurdle-shaped conductors shown in FIGS. 9A and 9B.

Referring to FIGS. 9-10, the windings include two vertical tiers or layers of end windings. In this example, the bridges of conductors that constitute each phase are arranged in two tiers: a inner (lower) bridge immediately adjacent to the end surface of the core and a second, outer (upper) bridge spanning over and passing axially above the inner bridge.

FIGS. 9A-9B show a stator core along with two portions of a conductor belonging to a common electrical phase of the machine. For purposes of description, the conductor comprises a first portion 318 and a second portion 418, both of which pass axially back-and-forth through. First portion 318 includes multiple axially extending in-slot portions 320 connected by bridges 324a-c. Second portion 418 includes multiple axially extending in-slot portions 420 connected by bridges 424a-c.

Referring now to FIG. 10, each conductor 318, 418 is, for purposes only of further description, said to be composed of a co-joined series of hurdle-shaped elements, each element further includes two uprights 320a-b, 420a-b disposed in slots defined by the core 314 and bridges 324a-b extending between, connecting, and formed integrally with the respective uprights. For purposes of description, first bridge 324a will hereafter be referred to the inner bridge, and second bridge 424a will hereafter be referred to the outer bridge. Inner bridge 324a has a slot span of five. Outer bridge 424a immediately axially above and parallel with inner bridge 324a and has a slot span of seven. Uprights 420a-b are disposed in slots immediately adjacent to and circumferentially outboard (relative to inner bridge 324a) of the slots containing uprights 320a-b. The junctions between uprights 420a-b and the ends of outer bridge 424a form inward-facing and outward-facing ledges 428, 426 located at the same axial position as the corresponding ledges 328, 326 of the inner bridge 324a. This configuration allows a radially nesting of adjacent bridges, substantially identical to that described in relation to the single-layer bridges of the previous two embodiments. In this embodiment, the bridges of the lower layer nest radially against one another, and the bridges of the upper layer nest radially against one another directly above those of the lower layer.

As seen in FIG. 9, conductor 420 includes the outer bridge 424a at the upper axial end (as viewed in the present figures) of core 314 and the inner bridge 424b at the opposite lower axial end. Likewise, conductor 320 comprises the inner bridge 324a at the upper axial end of core 314 and the outer bridge 324b at the opposite lower axial end. This is necessary due to the continuous nature of the conductors as they snake axially back and forth through the stator, and it results in all conductor paths having the same total length.

The disclosed design concepts utilize the flexibility of additive manufacturing to realize electric machine windings that are more compact without performance penalty. This is achieved by varying the conductor cross section shape in different parts of the machine, namely between the axial, in-slot portion and in the endturn or bridge portion, eliminating voids and wasted space and reducing the overall length of the conduction path. This also avoids the need for jumper or the crossing of endturns.

In conventional hairpin windings, conductors, commonly referred to as "jumpers," are used to complete the winding. When only the basic repetitive connection is employed, the winding would result in many isolated independent circuits (the total number of these circuits depending on how many conductors per slots and parallel path are in the design). These jumpers are usually placed above the rest of the conductors causing the axial length of the winding to grow. Taking advantage of the flexibility of 3D printing allows for the routing of some of the bridges to create nonoverlapping paths for these jumpers. From the outside, it appears there are no jumpers because the jumpers blend in with the bridges and they take up no additional space.

Figure 11:
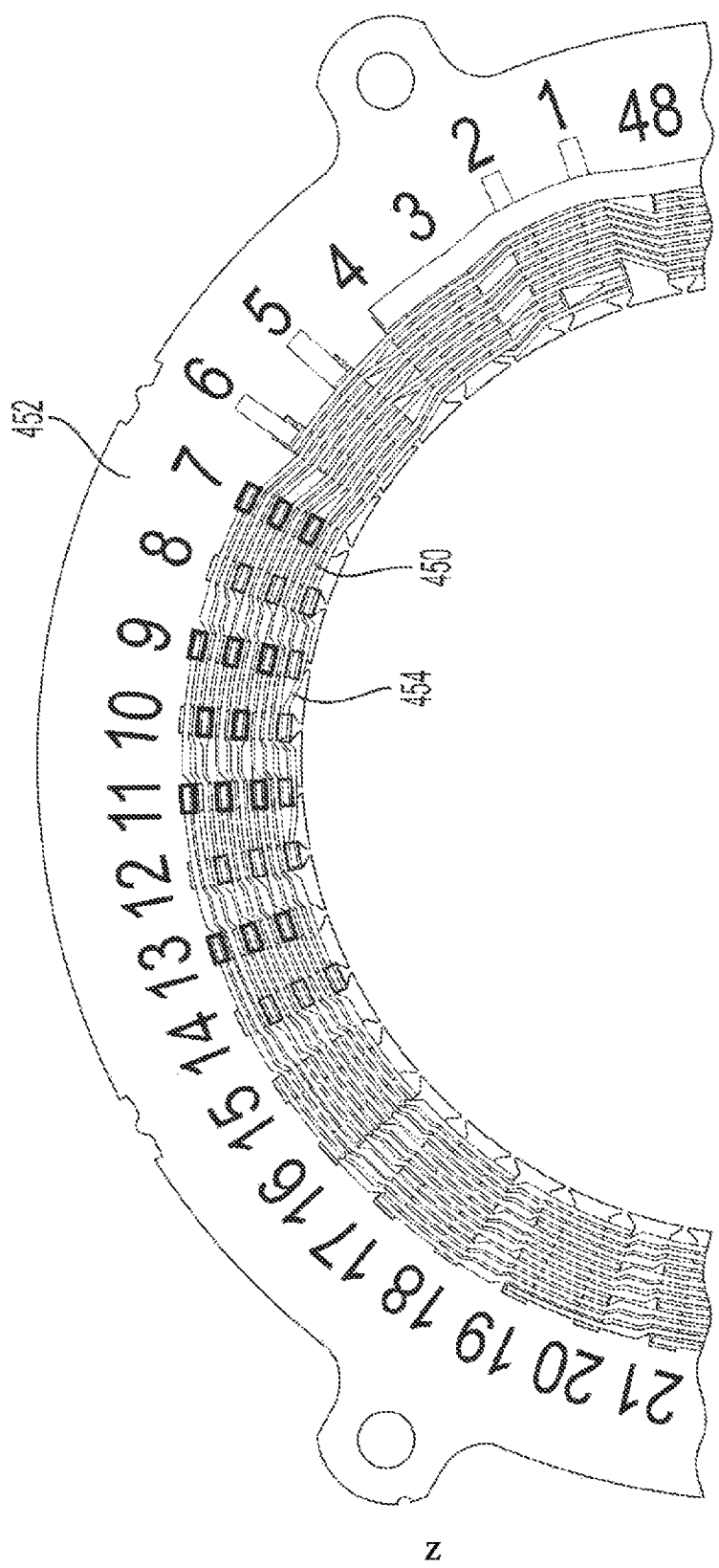
FIG. 11 is a top view of the electric machine showing locations of the bridge-hurdle connections.

FIG. 11 illustrates a top view of the stator with all phases shown. As can be seen, all of the bridges nest and none cross over each other. In this example, each slot includes 6 uprights. Some slots only include one of the phases, whereas other include at least two of the phases. The winding 9 utilizes the gap-side/yoke-side connections, variable-width bridges, and zig-zagging bridges to form a complete winding without jumpers or cross overs. It also allows for more bridges to be present at any one radial position than the number of conductors in the slot. For example, slot 13 houses six uprights but has twelve bridges of the upper layer extending over the top of slot 13. These twelve bridges are all in the same vertical plane and are side-by-side rather than crossing over each other. This increased radial density of bridges, e.g., twelve, is possible due to the combination of gap-side/yoke-side connections, variable-width bridges, and zig-zagging bridges. Most areas have twelve bridges, but, in other areas, the number of radially arranged bridges are less, for example, there are ten bridges of the upper layer extending over slot 9. The number of bridges of the lower layer may match the number bridges of the upper layer as they are generally stacked one on top the other, however, in some locations, the number may be different.

FIG. 11 also illustrates the yoke-side connections and the gap-side connections of the upper layer using boxes: the yoke side connections are in bold line type and the gap-site connections are in thinner line type. Some slots only include a single type of connection, e.g., slot 13 only has gap-side connections, whereas other slots include both types of connections, e.g., slot 11 has three yoke-side connections and one-side connection. In the illustrated embodiment, with the expectation of slots 1-13, each slot only includes one type of connection and the connection types alternate. For example, slot 20 includes all gap-side connections, slot 19 includes all yoke-side connections, slot 18 includes all gap-side connections, and so forth. The connections of the lower layer are generally opposite to the connections of the upper layer. For example, the lower layer of slot 13 includes three-side connections.

On each end of the stator core, each path generally stays on the same upper or lower layer (and is on the opposite layer on the other end of the core). This is true except for the turnaround conductors which are located in a different layer than the other pins of the path. The turnaround conductors are special conductor that reverses the direction of the winding, such as from counterclockwise to clockwise. For example, turnaround conductor 450 is associated with the first path of a phase that is mostly contained to the lower layer on the side 452 of the stator core. However, turnaround pin 450 is located in the upper layer. Similarly, turnaround conductor 454 is associated with the second path of a phase, which is mostly contained to the upper layer on side 452 of the stator core. However, turnaround pin 454 is located in the lower layer.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine comprising:
   a stator core defining slots having a number of radial positions; and
   a winding disposed in the core and having three phases, each of the phases having at least two parallel paths including hurdle-shaped conductors interconnected to form at least two continuous circuits between a terminal and a neutral, each of the hurdle-shaped conductors including first and second uprights disposed in a different one of the slot nd a bridge connecting between the uprights and extending circumferentially over an end surface of the core, wherein the bridges are stacked one on top of the other such that the winding has upper and lower layers, and wherein the bridges have variable thickness such that a number of bridges, at each of the upper and lower layers, extending over one of the slots exceeds the number of radial positions of that slot, wherein each of the paths includes one turn-around conductor that is disposed in a different one of the upper and lower layers than the other of the conductors of the path.

2. The electric machine of claim 1, wherein all of the bridges of each layer are raised from the end surface by a same distance.

3. The electric machine of claim 2, wherein the bridges of a same one of the paths do not cross over each other.

4. The electric machine of claim 1, wherein a thickness of the bridges is thinner than a thickness of the uprights, and the bridges are attached to the uprights at either a yoke-side connection or a gap-side connection.

5. The electric machine of claim 4, wherein, in one of the upper and lower layers, at least one of the slots only includes gap-side connections, at least one of the slots only includes yoke-side connections, and at least one of the slots includes both gap-side connections and yoke-side connections.

6. The electric machine of claim 1, wherein at least one of the slots only includes one of the phases, and at least one of the slots includes at least two of the phases.

7. The electric machine of claim 6, wherein the winding is formed by additive manufacturing.

8. The electric machine of claim 6, wherein;
   the bridge of a first of the conductors has a first end connected with a radially inner portion of the respective first upright to define a radially out rard-facing ledge at a junction between the first end and the first upright, and a second end connected with a radially outer portion of the respective second upright to define a radially inward-facing ledge at a junction between the second end and the second upright;
   the bridge of a second of the conductors located radially outward of the first conductor passes over the outward-facing ledge; and
   the bridge of a third of the conductors disposed radially inward of the first bridge passes over the inward-facing ledge.

9. The electric machine of claim 8, wherein at least one of the inward-facing and outward-facing ledges are slanted with respect to a plane of the core end surface to provide a gradual change in cross-sectional area where the bridge is connected to the respective ledge.

10. An electric machine comprising:
a stator core defining slots having a number of radial positions; and
a plurality of hurdle-shaped conductors interconnected to for at least two parallel paths, each of the hurdle-shaped conductors including first and second uprights disposed in a different one of the slots and a bridge connecting between the uprights and extending circumferentially over an end surface of the core, wherein the bridges are stacked one on top of the other in upper and lower layers, and wherein the bridges have variable thickness and are arranged to nest with each other such that a number of bridges extending over each of the slots at each of the upper and lower layers exceeds the number of radial positions of that slot, wherein the bridges are attached to the uprights at either a yoke-side connection or a gap-side connection, wherein, in one of the upper and lower layers, at least one of the slots only includes gap-side connections, at least one of the slots only includes yoke-side connections, and at least one of the slots includes both gap-side connections and yoke-side connections.

11. The electric machine of claim 10, wherein all of the bridges of each layer are raised from the end surface by a same distance such that the bridges of a same one of the paths do not cross over each other.

12. The electric machine of claim 10, wherein a thickness of the bridges is thinner than a thickness of the uprights.

13. An electric machine comprising:
stratified layers arranged to form
a stator core defining slots having a number of radial positions; and
a winding disposed in the core and having three phases, each of the phases having at least two parallel paths including hurdle-shaped conductors interconnected to form at least two continuous circuits between a terminal and a neutral, each the hurdle-shaped conductors including first and second uprights disposed in a different one of the slots and a bridge connecting between the uprights and extending circumferentially over an end surface of the core, wherein the bridges are stacked one on top of the other such that the winding has upper and lower layers, and wherein the bridges have variable thickness such that a number of bridges, at each of the upper and lower layers, extending over one of the lots exceeds the umber of radial positions of that slot, wherein each of the paths includes one turn-around conductor that is disposed in a different one of the upper and lower layers than the other of the conductors of the path.

14. The electric machine of claim 13, wherein all of the bridges of each layer are raised from the end surface by a same distance such that the bridges of a same one of the paths do not cross over each other.

15. The electric machine of claim 13, wherein:
the bridge of a first of the conductors has a first end connected with radially inner portion of the respective first upright to define a radially outward-facing ledge at a junction between the first end and the first upright, and a second end connected with a radially outer portion of the respective second upright to define a radially inward-facing ledge at a junction between the second end and the second upright;
the bridge of a second of the conductors located radially outward of the first conductor passes over the outward-facing ledge; and
the bridge of a third of the conductors disposed radially inward of the first bridge passes over the inward-facing ledge.

16. The electric machine of claim 13, wherein a thickness of the bridges is thinner than a thickness of the uprights, and the bridges are attached to the uprights at either a yoke-side connection or a gap-side connection, and wherein, in one of the upper and lower layers, at least one of the slots only includes gap-side connections, at least one of the slots only includes yoke-side connections, and at least one of the slots includes both gap-side connections and yoke-side connections.

\* \* \* \* \*